United States Patent
Nayebi et al.

(10) Patent No.: US 10,749,555 B2
(45) Date of Patent: Aug. 18, 2020

(54) TIME-DOMAIN IQ MISMATCH COMPENSATOR WITH FREQUENCY-DOMAIN OBSERVATIONS

(71) Applicant: Samsung Electronics Co., Ltd., Gyeonggi-do (KR)

(72) Inventors: Elina Nayebi, San Diego, CA (US); Pranav Dayal, San Diego, CA (US); Kee-Bong Song, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/243,710

(22) Filed: Jan. 9, 2019

(65) Prior Publication Data

US 2020/0099408 A1    Mar. 26, 2020

Related U.S. Application Data

(60) Provisional application No. 62/736,595, filed on Sep. 26, 2018.

(51) Int. Cl.
*H04B 1/10* (2006.01)
*H04L 27/26* (2006.01)

(52) U.S. Cl.
CPC ......... *H04B 1/1027* (2013.01); *H04L 27/265* (2013.01)

(58) Field of Classification Search
CPC .. H04L 27/3836; H04L 27/3872; H03D 3/009
See application file for complete search history.

(56) References Cited

U.S. PATENT DOCUMENTS

| | | | |
|---|---|---|---|
| 8,064,542 B1 | 11/2011 | Lee | |
| 9,231,633 B1* | 1/2016 | Petrovic | H04B 1/30 |
| 2005/0180532 A1* | 8/2005 | Lee | H04B 1/30 375/346 |
| 2006/0291590 A1 | 12/2006 | Elahi et al. | |
| 2007/0263714 A1 | 11/2007 | Bois et al. | |
| 2011/0182388 A1 | 7/2011 | Kim et al. | |
| 2012/0270516 A1* | 10/2012 | Kang | H04B 1/30 455/233.1 |
| 2013/0031152 A1 | 1/2013 | Sun | |

(Continued)

OTHER PUBLICATIONS

Valkama et al., "Advanced Methods for I/Q Imbalance Compensation in Communication Receivers", IEEE Transactions on Signal Processing, vol. 49, No. 10, Oct. 2001, 10 pages.

(Continued)

*Primary Examiner* — Kevin Kim
(74) *Attorney, Agent, or Firm* — The Farrell Law Firm, P.C.

(57) ABSTRACT

A system, method, and electronic device for compensating in-phase (I) and quadrature (Q) mismatch (IQMM) are herein disclosed. The system includes an IQ mismatch compensator (IQMC) configured to compensate for IQMM between a time-domain I signal and a time-domain Q signal using filter weight coefficients, and output a compensated I signal and a compensated Q signal, a fast Fourier transformation (FFT) circuit configured to perform an FFT on the compensated I signal and the compensated Q signal to a frequency-domain compensated signal, and a coefficient updater configured to update the filter weight coefficients based on a frequency-domain observation of the frequency-domain compensated signal.

17 Claims, 6 Drawing Sheets

(56) References Cited

U.S. PATENT DOCUMENTS

| | | |
|---|---|---|
| 2013/0170581 A1 | 7/2013 | Loh et al. |
| 2013/0259173 A1* | 10/2013 | Varanese ............... H04L 1/0001 |
| | | 375/346 |
| 2015/0172082 A1 | 6/2015 | Belveze et al. |
| 2016/0373288 A1 | 12/2016 | Subramani et al. |
| 2018/0241606 A1* | 8/2018 | Li ......................... H04L 27/265 |

OTHER PUBLICATIONS

Petit et al., "Analysis of a Properness-Based Blind Adaptive I/Q Filter Mismatch Compensation", IEEE Transactions on Wiress Communications, vol. 15, No. 1, Jan. 2016, 13 pages.

Lin et al., "Time Domain Blind I/Q Imbalance Compensation based on Real-Valued Filter", IEEE Transactions on Wireless Communications, vol. 11, No. 12, Dec. 2012, 9 pages.

Xing et al., "Frequency Offset and I/Q Imbalance Compensation for Direct-Conversion Receivers", IEEE Transactions on Wireless Communications, Vol, 4, No. 2, Mar. 2005, 8 pages.

Zhu et al., Blind Compensation of Frequency-Dependent I/Q Imbalance in Direct Conversion OFDM Receivers, IEEE Communications Letters, vol. 17, No. 2, Feb. 2013, 4 pages.

Tsai et al., "Blind Frequency-Dependent I/Q Imbalance Compensation for Direct-Conversion Receivers", IEEE Transactions on Wireless Communications, vol. 9, No. 6, Jun. 2010, 11 pages.

* cited by examiner

TIME-DOMAIN IQ MISMATCH COMPENSATOR WITH FREQUENCY-DOMAIN OBSERVATIONS

PRIORITY

This application is based on and claims priority under 35 U.S.C. § 119(e) to a U.S. Provisional Patent Application filed on Sep. 26, 2018 in the United States Patent and Trademark Office and assigned Ser. No. 62/736,595, the entire contents of which are incorporated herein by reference.

FIELD

The present disclosure relates generally to a method and system for mismatch compensation between in-phase and quadrature branches in down-conversion receivers. In particular, the present disclosure relates to a time-domain IQ mismatch compensator with frequency-domain observations.

BACKGROUND

The imbalance between in-phase (I) and quadrature (Q) branches of down-conversion receivers creates interference between the mirror frequencies after down-conversion to the baseband. The IQ mismatch (IQMM) caused by non-ideal characteristics of I and Q paths degrades the system performance by reducing the effective signal to interference ratio. Hence, IQ mismatch compensation (IQMC) is crucial for the design of wideband systems with quadrature down-conversion architecture.

SUMMARY

According to one embodiment, system for compensating IQMM is provided. The system includes an IQ mismatch compensator (IQMC) configured to compensate for IQMM between a time-domain I signal and a time-domain Q signal using filter weight coefficients, and output a compensated I signal and a compensated Q signal, a fast Fourier transformation (FFT) circuit configured to perform an FFT on the compensated I signal and the compensated Q signal to a frequency-domain compensated signal, and a coefficient updater configured to update the filter weight coefficients based on a frequency-domain observation of the frequency-domain compensated signal According to one embodiment, a method for compensating IQMM is provided. The method includes compensating, with an IQMC, for IQMM between a time-domain I signal and a time-domain Q signal using filter weight coefficients, outputting, with the IQMC, a compensated I signal and a compensated Q signal, transforming, with an FFT circuit, the compensated I signal and the compensated Q signal to a frequency-domain compensated signal, and updating, with a coefficient updater, the filter weight coefficients based on a frequency-domain observation of the frequency-domain compensated signal According to one embodiment, an electronic device for compensating IQMM is provided. The electronic device includes an IQMC, an FFT circuit, a coefficient updater, a processor, and a non-transitory computer readable storage medium storing instructions that, when executed, cause the processor to compensate, with the IQMC, for IQMM between a time-domain I signal and a time-domain Q signal using filter weight coefficients, output, with the IQMC, a compensated I signal and a compensated Q signal, transform, with the FFT circuit, the compensated I signal and the compensated Q signal to a frequency-domain compensated signal, and update, with the coefficient updater, the filter weight coefficients based on a frequency-domain observation of the frequency-domain compensated signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
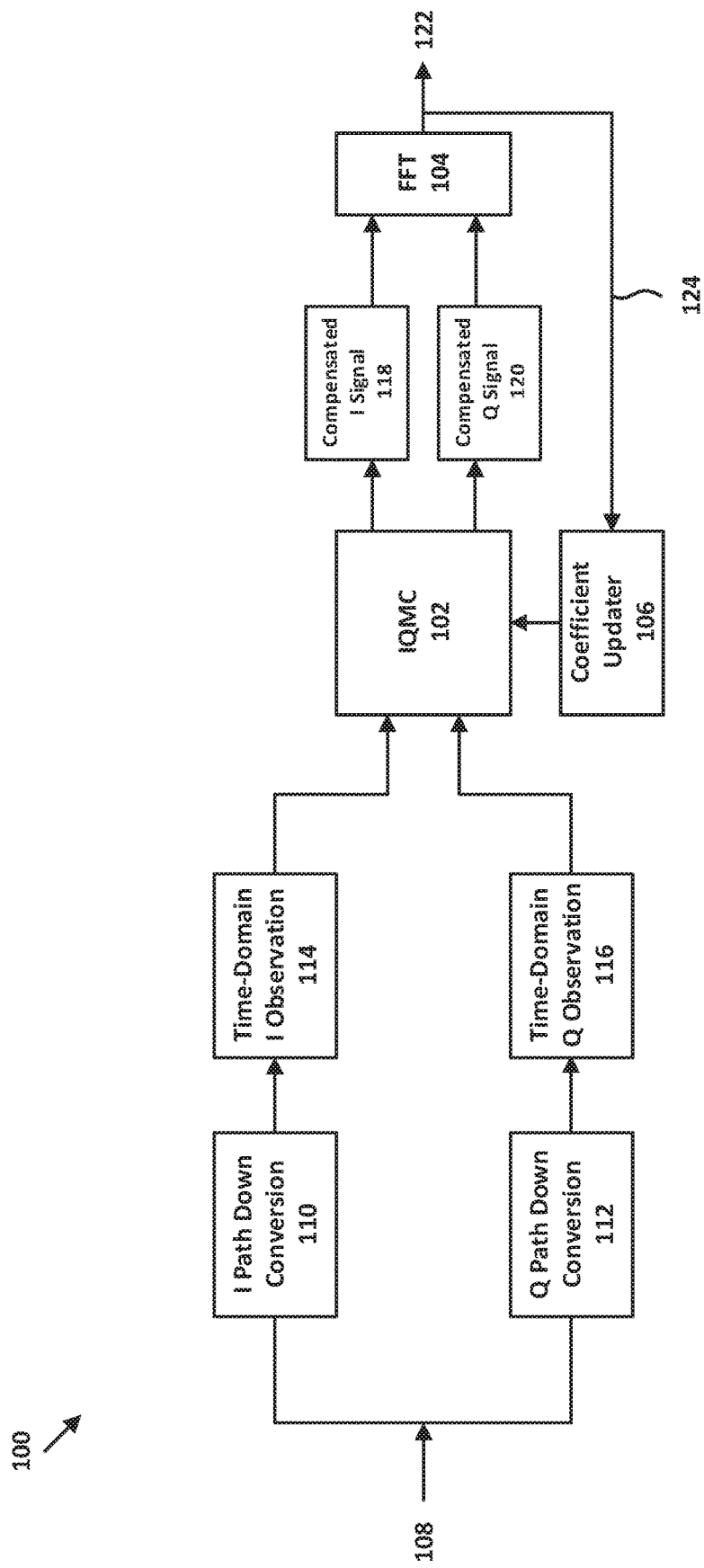
FIG. 1 is a diagram of a system 100 for compensating for IQMM, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st", "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with,", to, ""connected with coupled"" or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The systems, methods, and devices provided herein adapt time-domain IQMC filter weights in quadrature down-conversion receivers using frequency-domain observations to compensate frequency-independent IQMM (FI-IQMM) and frequency-dependent IQMM (FD-IQMM). In particular, the systems, methods, and devices use frequency-domain observations to adapt filter coefficients in a real-valued time-domain IQMC according to one embodiment. Domain observations may be referred to interchangeably as domain signals. A gradient of a generic frequency-domain cost function (such as kurtosis and ED cost functions) with respect to the coefficients of a real-valued time-domain IQMC is obtained that depends only on the filter coefficients and frequency-domain observations.

A gradient descent approach is utilized to adjust the filter weights at each iteration. However, any other method can be used to adapt the filter weights. Other methods such as a Newton algorithm can also be used to adjust the filter weights. However, this method requires obtaining the Hessian matrix which is the second-order partial derivative of the cost function with respect to IQMC filter coefficients. The gradient of a generic frequency-domain cost function with respect to filter coefficients generally depends on the time-domain observations. This gradient is obtained for a generic cost function such that it only depends on the frequency-domain observations and filter weights rather than the time-domain observations. Two different cost functions are utilized for IQMC compensation in orthogonal frequency-division multiplexing (OFDM) systems that result in two semi-blind algorithms, the first being kurtosis of the frequency-domain observation and the second being Euclidean distance (ED) between the frequency-domain impaired signal and the received constellation.

FIG. 1 is a diagram of a system 100 for compensating for IQMM, according to an embodiment. The system 100 includes an IQMC 102, a fast Fourier transformation (FFT) circuit 104, and a filter weight coefficient updater 106.

A signal 108 is input to the system 100. The signal 108 is sent through an I path down conversion 110 and Q path down conversion 112 and a time-domain I observation 114 and a time-domain Q observation 116 are obtained, respectively. The observations 114 and 116 are sent to the IQMC 102 for compensation. Utilizing filter weight coefficients, the IQMC 102 generates a compensated I signal 118 and a compensated Q signal 120. The compensated signals 118 and 120 are sent to the FFT 104 to transform the signals into the frequency-domain. The frequency-domain signal 122 may be output from the system 100. Furthermore, a frequency-domain observation 124 is obtained from the signal 122. The frequency-domain observation 124 is sent to the coefficient updater 106 and is used to update the filter weight coefficients as will be described in detail further below.

Figure 2:
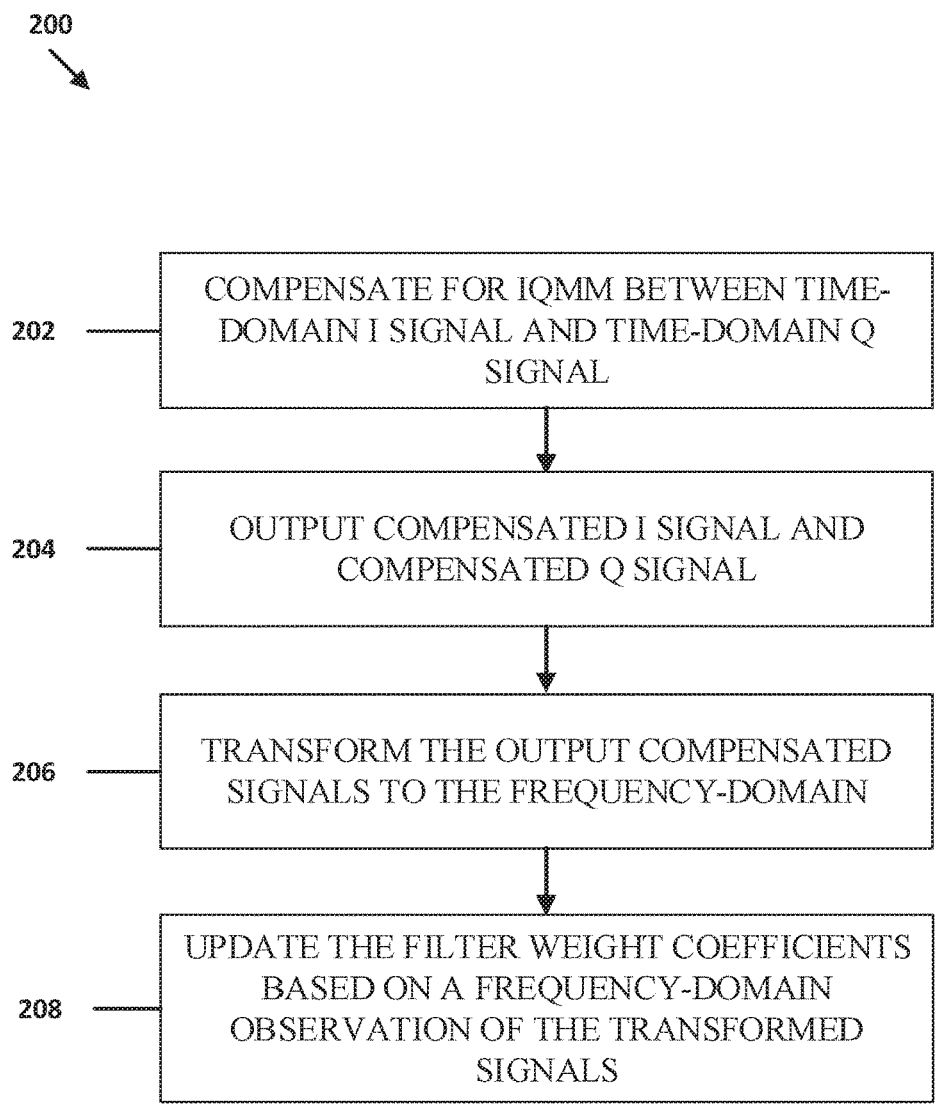
FIG. 2 is a flowchart of a method for compensating for IQMM, according to an embodiment.

FIG. 2 is a flowchart 200 of a method for compensating for IQMM, according to an embodiment. At 202, IQMM between a time-domain I signal and a time-domain Q signal is compensated. The IQMM may be compensated by an IQMC.

Figure 3:
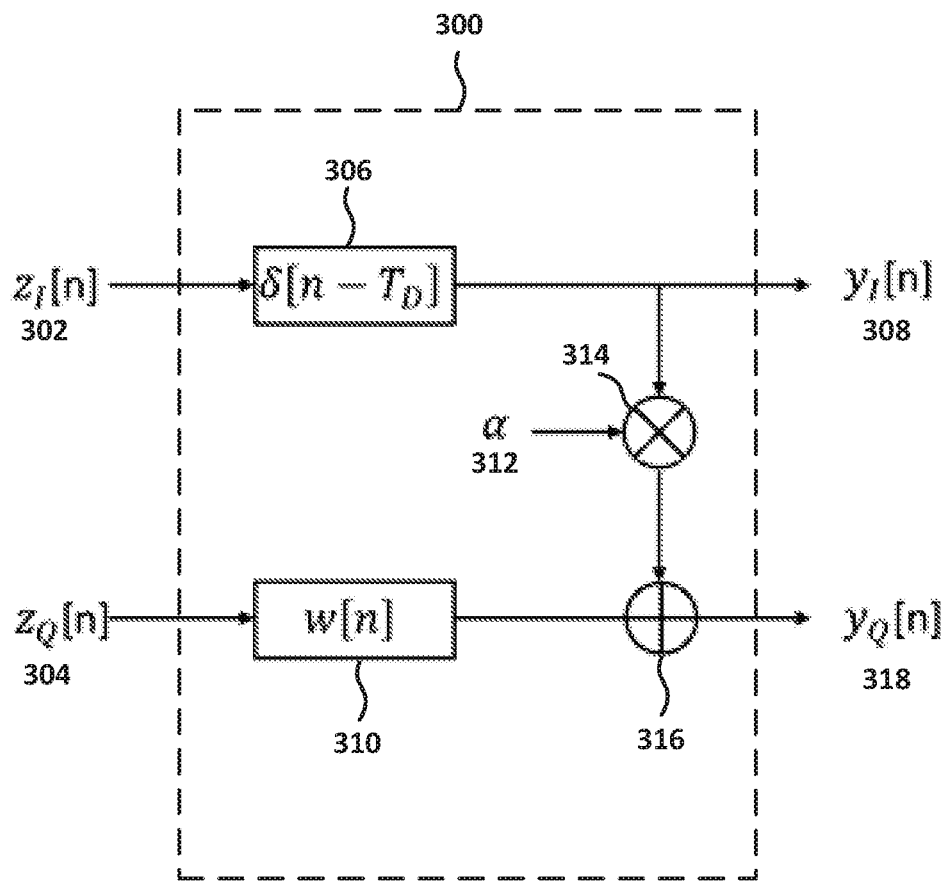
FIG. 3 is a diagram of an IQMC, according to an embodiment.

FIG. 3 is a diagram of a real-valued IQMC 300, according to an embodiment. The time-domain I observation 302 is fed into delay element 306 and the IQMC 300 generates a compensated I signal 308. The time-domain Q observation 304 is fed through a filter with weight coefficients w[n] 310. The signal output from the delay element 306 is combined with a second filter weight coefficient ($\alpha$) 312 through mixer 314. The signal output from the filter 310 is then added with the mixed signal at 314 via adder 316, and the signal generated is the compensated Q signal 318. Thus, the IQMC 300 generates compensated signals 308 and 318 using filter weight coefficients 310 and 312.

Referring back to flowchart 200 of FIG. 2, at 204, the compensated I signal and compensated Q signal are outputted. The IQMC 300 may output the generated and compensated I signal 308 and Q signal 318.

At 206, the output compensated signals are transformed to the frequency-domain. The transformation may be performed by an FFT circuit. The signals when compensated by the IQMC 300 are compensated in the time-domain, requiring a transformation to the frequency-domain for further functionality.

At 208, the filter weight coefficients are updated based on a frequency-domain observation of the transformed signals. The filter weight coefficients may be updated by a coefficient updater, as is described in further detail below.

One purpose of the systems, methods, and devices disclosed herein is to update filter weights $\alpha \in \mathbb{R}$ and $w = [w[0], \ldots w[L-1]]^T \in \mathbb{R}^{L \times 1}$ of a real-valued time-domain IQMC to compensate IQMM. These filter coefficients are updated based on the frequency domain observations $Y_k$, $k=-K, \ldots, +K$, where k is the index of the subcarrier. As shown herein, the IQMC is located in the time-domain.

Given $x = [\alpha \ w^T]^T$ as the filter coefficients of real-value IQMC. The filter weight coefficients are updated at the (l+1)th iteration using gradient descent algorithm as in Equation (1):

$$x^{l+1} = x^l - \frac{\mu}{2K} \sum_{k=-K}^{K} \frac{\partial J_k}{\partial x}\bigg|_{x=x^l}, \quad (1)$$

where $J_k = f(Y_k)$ is the cost function at the kth subcarrier, which is a function of frequency-domain observations, and $\mu$ is step size, which can be a function of iteration. From Equation (1) it can be seen that the gradient of cost function $J_k$ with respect to filter coefficients, i.e., $$\frac{\partial J_k}{\partial x}$$

needs to be calculated. This gradient, in general, depends on the time domain observations $z[n]$ ($z[n] = z_I[n] + jz_Q[n]$), which in turn, requires a time domain buffer to store $z[n]$. However, as is described herein, the gradient of cost function is obtained as a function of $\alpha$, frequency response of w (i.e., $W_k$) and frequency-domain observations $Y_k$, $k=-K, \ldots, +K$.

In one example, kurtosis of $Y_k$ is utilized as the cost function. Kurtosis of the k-th tone observations $Y_k$ is defined as in Equation (2):

$$\text{kurt}(k) = \frac{M \sum_{t=1}^{M} |Y_k^{(t)}|^4}{\left(\sum_{t=1}^{M} |Y_k^{(t)}|^2\right)^2}, \quad (2)$$

where superscript (t) is the OFDM symbol index and M is the number of OFDM symbols for which the kurtosis is computed.

In another example, ED between the post-FFT impaired signal and the received constellation is utilized as our cost function which is given by Equation (3):

$$ED(k) = \frac{1}{M} \sum_{t=1}^{M} |Y_k^{(t)} - U_{1,k} H_k^{(t)} X_k^{(t)}|^2, \quad (3)$$

where $U_{1,k} H_k^{(t)} X_k^{(t)}$ is referred to as the constellation, $X_k^{(t)}$ is a known reference signal sent by the transmitter, $H_k^{(t)}$ is the channel response on the (t)th OFDM symbol of the kth subcarrier, and $U_{1,k}$ is a parameter that contains effects of IQMM and real-valued IQMC. $U_{1,k} H_k^{(t)}$ is known through channel estimation.

The gradient of the cost function $J_k$ can be computed as in Equation (4):

$$\frac{\partial J_k}{\partial x_l} = \sum_{t=1}^{M} \text{Re}(F_k^{(t)*} V_{k,l}^{(t)}), \text{ for } l = 0, \ldots L. \quad (4)$$

The gradient calculation involves computing $$F_k^{(t)} = \frac{\partial J_k}{\partial \text{Re}\{Y_k^{(t)}\}} + j \frac{\partial J_k}{\partial \text{Im}\{Y_k^{(t)}\}} \text{ and } V_{k,l}^{(t)} = \frac{\partial \text{Re}\{Y_k^{(t)}\}}{\partial x_l} + j \frac{\partial \text{Im}\{Y_k^{(t)}\}}{\partial x_l}$$

for $k=-K, \ldots, K$ and $l=0, \ldots L$. $F_k^{(t)}$ for kurtosis-based adaptation can be computed as in Equation (5):

$$F_k^{(t)} = \frac{4M}{G_{2,k}} \left[ \frac{|Y_k^{(t)}|^2}{G_{2,k}} - \frac{G_{4,k}}{G_{2,k}^2} \right] Y_k^{(t)}, \quad (5)$$

where intermediate terms $G_{2,k}$ and $G_{4,k}$ are defined as in Equation (6):

$$G_{2,k} = \sum_{t=1}^{M} |Y_k^{(t)}|^2, \ G_{4,k} = \sum_{t=1}^{M} |Y_k^{(t)}|^4. \quad (6)$$

For ED-based adaptation, $F_k^{(t)}$ can be computed as in Equation (7):

$$F_k^{(t)} = \frac{2}{M} (Y_k^{(t)} - U_{1,k} H_k^{(t)} X_k^{(t)}). \quad (7)$$

The length of the channel plus L−2 is smaller than the cyclic prefix length and the gradient $V_{k,l}^{(t)}$ of the cost function with respect to the filter weight coefficients is obtained as in Equation (8):

$$V_{k,l}^{(t)} = \begin{cases} \frac{e^{\frac{j\pi}{2}}}{2}(Y_k^{(t)} + Y_{-k}^{(t)*}) & \text{for } l = 0 \\ -\frac{e^{j\left(\frac{\pi}{2} - \frac{2\pi(l-1)k}{N}\right)}}{2W_k}((\alpha+j)Y_k^{(t)} + (\alpha-j)Y_{-k}^{(t)*}) & \text{for } l = 1, \ldots, L \end{cases}, \quad (8)$$

where $W_k$ is the frequency-domain response of filter w[n] at the kth tone. The computation of $V_{k,l}^{(t)}$ is the same for any frequency-domain cost function in the real-valued IQMC and the only difference between different cost functions is computation of $F_k^{(t)}$. If another IQMC method is used, $V_{k,l}^{(t)}$ also changes but a similar method can be used to obtain the gradient as a function of frequency domain observations and filter weights only. The gradient depends only on the filter coefficients and frequency-domain observations.

Figure 4:
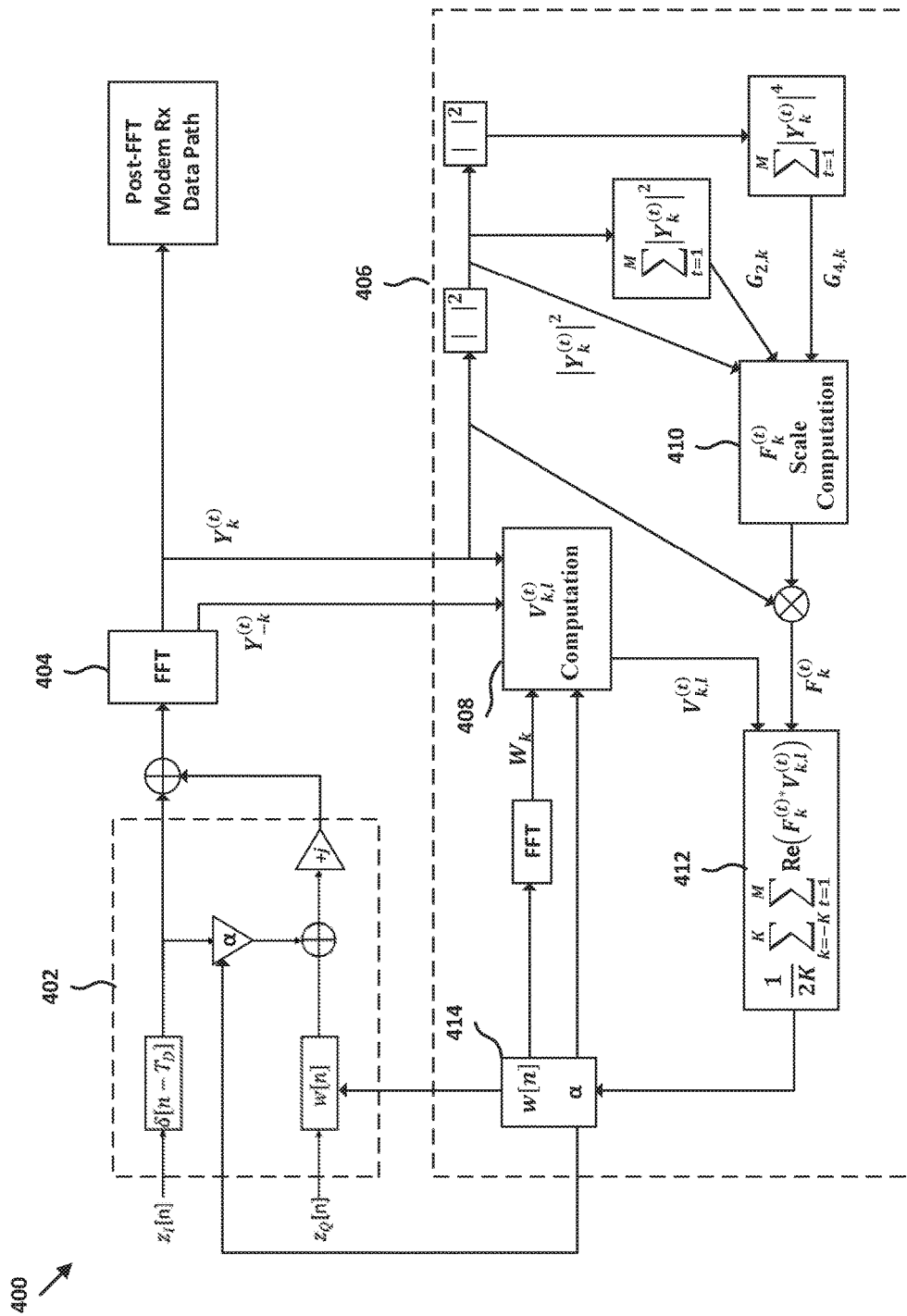
FIG. 4 is a diagram of a system for IQMM compensation and filter weight coefficient updating in an iterative kurtosis-based adaptation, according to an embodiment.

FIG. 4 is a diagram of a system 400 for IQMM compensation and filter weight coefficient updating in an iterative kurtosis-based adaptation, according to an embodiment. The system 400 includes an IQMC 402, an FFT circuit 404 and a filter weight coefficient updater 406. $V_{k,l}^{(t)}$ computation 408 is performed as in Equation (8), based on frequency-domain observations $Y_k^{(t)}$ and $Y_{-k}^{(t)}$ at the initial iteration (e.g., l=0, $\alpha$=0 and w=$[0_{1 \times T_D}, 1, 0_{1 \times (L-T_D-1)}]^T$), and in further iterations, $V_{k,l}^{(t)}$ computation 408 is performed based on the frequency-domain response $W_k$ of filter weight coefficient w[n], and filter weight coefficient $\alpha$. $F_k^{(t)}$ scale computation 410 is performed as in Equation (5) based on intermediate terms $G_{2,k}$ and $G_{4,k}$, and the frequency-domain observation parameter $|Y_k^{(t)}|^2$.

The gradient of the cost function 412 is performed based on $F_k^{(t)}$ and $V_{k,l}^{(t)}$, and the filter weight coefficients 414 are updated. The updated filter weight coefficients 414 are then sent back to the IQMC 402 for further IQMM compensation.

Figure 5:
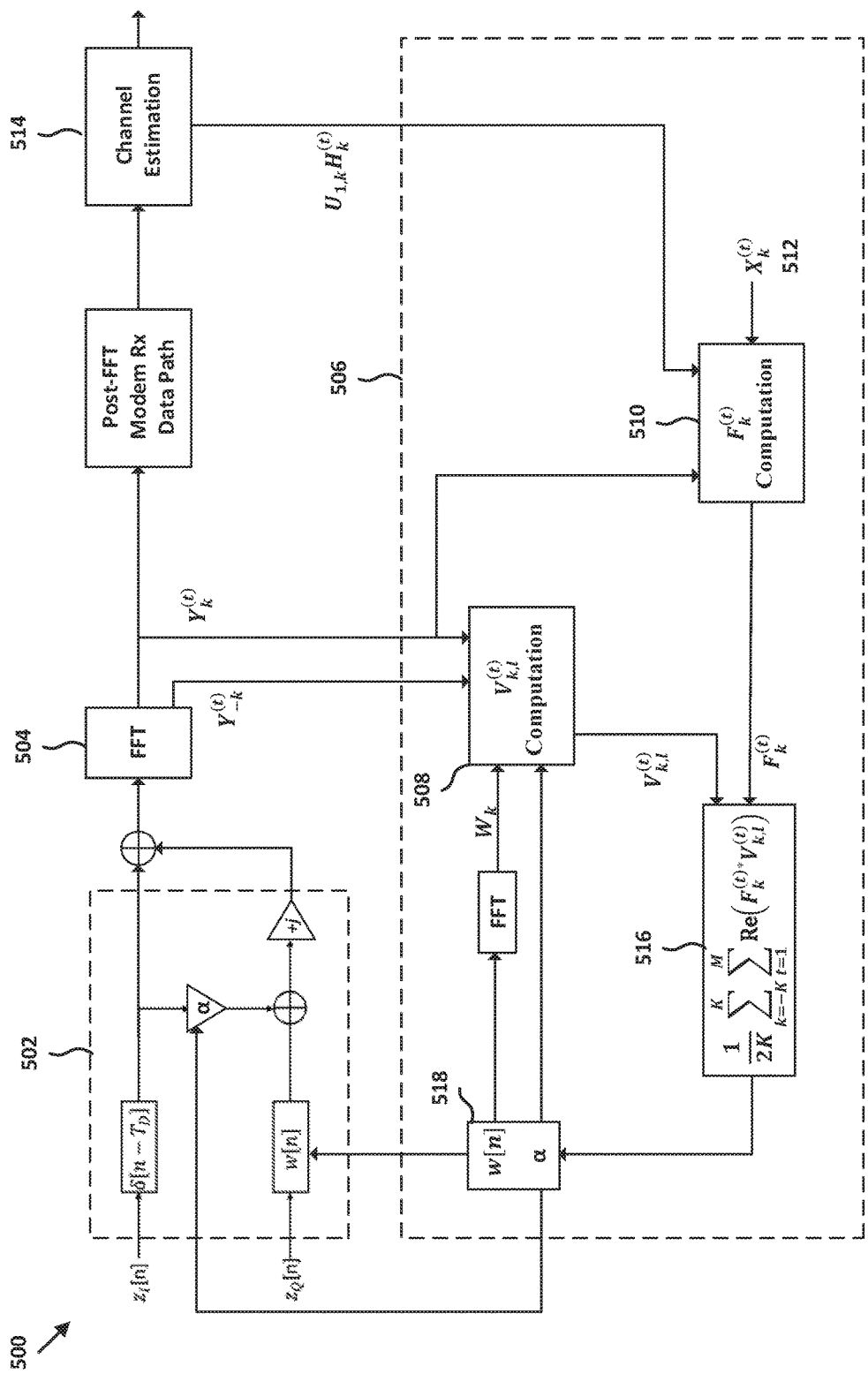
FIG. 5 is a diagram of a system for IQMM compensation and filter weight coefficient updating in an iterative Euclidean distance (ED)-based adaptation, according to an embodiment.

FIG. 5 is a diagram of a system 500 for IQMM compensation and filter weight coefficient updating in an iterative ED-based adaptation, according to an embodiment. The system 500 includes an IQMC 502, an FFT circuit 504, and a filter weight coefficient updater 506.

$V_{k,l}^{(t)}$ computation 508 is performed as in Equation (8), based on frequency-domain observations $Y_k^{(t)}$ and $Y_{-k}^{(t)*}$ at the initial iteration (e.g., l=0), and in further iterations, $V_{k,l}^{(t)}$ computation 508 is performed based on the frequency-domain response $W_k$ of filter weight coefficient w[n], and filter weight coefficient $\alpha$. $F_k^{(t)}$ computation 510 is performed as in Equation (7), based on frequency-domain observations $Y_k^{(t)}$, a reference signal 512 $X_k^{(t)}$, the channel response $H_k^{(t)}$ on the (t)th OFDM symbol of the kth subcarrier, and the parameter $U_{1,k}$ that contains effects of IQMM and real-valued IQMC, with $U_{1,k}H_k^{(t)}$ being determined from channel estimation 514.

The gradient of the cost function 516 is performed based on $F_k^{(k)}$ and $V_{k,l}^{(t)}$, and the filter weight coefficients 518 are updated. The updated filter weight coefficients 518 are then sent back to the IQMC 502 for further IQMM compensation.

Figure 6:
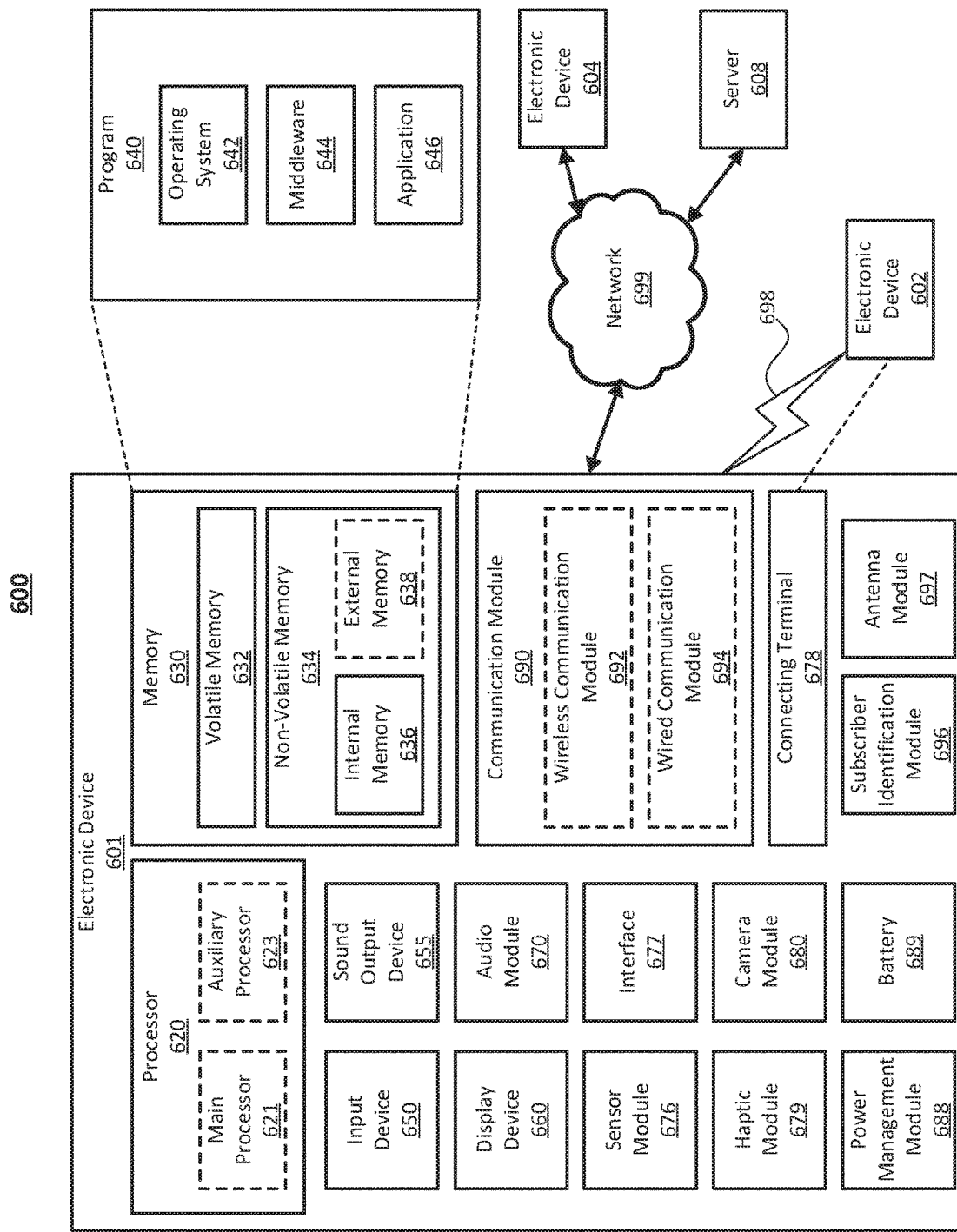
FIG. 6 is a block diagram of an electronic device in a network environment, according to one embodiment.

FIG. 6 is a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A system for compensating in-phase (I) and quadrature (Q) mismatch (IQMM), comprising:
    an IQ mismatch compensator (IQMC) configured to:
        compensate for IQMM in a time domain, including frequency dependent IQMM, between a time-domain I signal and a time-domain Q signal using filter weight coefficients; and
        output a compensated I signal and a compensated Q signal;
    a fast Fourier transformation (FFT) circuit configured to perform an FFT on the compensated I signal and the compensated Q signal to a frequency-domain compensated signal; and
    a coefficient updater configured to update the filter weight coefficients based on a frequency-domain observation of the frequency-domain compensated signal and to determine the updated filter weight coefficients based on a gradient of a cost function of the frequency-domain observation.

2. The system of claim 1, wherein the IQMC is further configured to receive the updated filter weight coefficients from the coefficient updater and compensate for IQMM using the updated filter weight coefficients.

3. The system of claim 1, wherein the gradient of the frequency-domain cost function is a function of the filter weight coefficients and the frequency-domain observation.

4. The system of claim 1, wherein the frequency-domain cost function is based on kurtosis of the frequency-domain observation.

5. The system of claim 1, wherein the coefficient updater is configured to update the filter weight coefficients based on a gradient descent algorithm applying the gradient of the cost function.

6. The system of claim 1, wherein the frequency-domain cost function is based on a Euclidean distance between the frequency-domain observation and a constellation, and wherein the constellation is based on a known reference signal and channel response.

7. A method for compensating in-phase (I) and quadrature (Q) mismatch (IQMM), comprising:
    compensating, with an IQ mismatch compensator (IQMC), for IQMM in a time domain, including frequency dependent IQMM, between a time-domain I signal and a time-domain Q signal using filter weight coefficients;
    outputting, with the IQMC, a compensated I signal and a compensated Q signal;
    transforming, with a fast Fourier transformation (FFT) circuit, the compensated I signal and the compensated Q signal to a frequency-domain compensated signal;
    updating, with a coefficient updater, the filter weight coefficients based on a frequency-domain observation of the frequency-domain compensated signal; and
    determining, with the coefficient updater, the updated filter weight coefficients based on a gradient of a cost function of the frequency-domain observation.

8. The method of claim 7, further comprising:
    receiving, with the IQMC, the updated filter weight coefficients from the coefficient updater; and
    compensating, with the IQMC, for IQMM using the updated filter weight coefficients.

9. The method of claim 7, wherein the gradient of the frequency-domain cost function is a function of the filter weight coefficients and the frequency-domain observation.

10. The method of claim 7, wherein the frequency-domain cost function is based on kurtosis of the frequency-domain observation.

11. The method of claim 7, wherein the filter weight coefficients are updated based on a gradient descent algorithm applying the gradient of the cost function.

12. The method of claim 7, wherein the frequency-domain cost function is based on a Euclidean distance between the frequency-domain observation and a constellation, and wherein the constellation is based on a known reference signal and channel response.

13. An electronic device for compensating in-phase (I) and quadrature (Q) mismatch (IQMM), comprising:
   an IQ mismatch compensator (IQMC);
   a coefficient updater,
   a fast Fourier transformation (FFT) circuit;
   a processor; and
   a non-transitory computer readable storage medium storing instructions that, when executed, cause the processor to:
      compensate, with the IQMC, for IQMM in a time domain, including frequency dependent IQMM, between a time-domain I signal and a time-domain Q signal using filter weight coefficients;
      output, with the IQMC, a compensated I signal and a compensated Q signal;
      transform, with the FFT circuit, the compensated I signal and the compensated Q signal to a frequency-domain compensated signal;
      update, with the coefficient updater, the filter weight coefficients based on a frequency-domain observation of the frequency-domain compensated signal, and
      determine, with the coefficient updater. the updated filter weight coefficients based on a gradient of a cost function of the frequency-domain observation.

14. The electronic device of claim 13, wherein the gradient of the frequency-domain cost function is a function of the filter weight coefficients and the frequency-domain observation.

15. The electronic device of claim 13, wherein the frequency-domain cost function is based on kurtosis of the frequency-domain observation.

16. The electronic device of claim 13, wherein the filter weight coefficients are updated based on a gradient descent algorithm applying the gradient of the cost function.

17. The electronic device of claim 13, wherein the frequency-domain cost function is based on a Euclidean distance between the frequency-domain observation and a constellation, and wherein the constellation is based on a known reference signal and channel response.

* * * * *